US008981662B1

(12) United States Patent
Zhang et al.

(10) Patent No.: US 8,981,662 B1
(45) Date of Patent: Mar. 17, 2015

(54) BACKLIGHT DRIVING CIRCUIT AND LIQUID CRYSTAL DISPLAY

(71) Applicant: Shenzhen China Star Optoelectronics Technology Co., Ltd., Shenzhen, Guangdong (CN)

(72) Inventors: Hua Zhang, Guangdong (CN); Fei Li, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 14/114,531

(22) PCT Filed: Sep. 5, 2013

(86) PCT No.: PCT/CN2013/083000

§ 371 (c)(1),
(2) Date: Oct. 29, 2013

(30) Foreign Application Priority Data

Sep. 2, 2013 (CN) .......................... 2013 1 0392644

(51) Int. Cl.
*H05B 41/16* (2006.01)
*G02F 1/1335* (2006.01)
*H05B 33/08* (2006.01)

(52) U.S. Cl.
CPC .......... *G02F 1/1336* (2013.01); *H05B 33/0815* (2013.01)
USPC ........ 315/247; 315/185 S; 315/291; 315/307; 315/312

(58) Field of Classification Search
USPC ....... 315/247, 224, 225, 291, 307–326, 185 S
See application file for complete search history.

(56) References Cited

U.S. PATENT DOCUMENTS

2006/0261754 A1 * 11/2006 Lee .............................. 315/291
2013/0009557 A1 * 1/2013 Szczeszynski ................ 315/186

* cited by examiner

*Primary Examiner* — Tuyet Thi Vo
(74) *Attorney, Agent, or Firm* — Andrew C. Cheng

(57) ABSTRACT

A backlight driving circuit is disclosed. The backlight driving circuit includes a boost circuit, a constant-current driving chip, a detecting module and a LED string coupled with the boost circuit. The boost circuit boosts an input voltage and then provides the boosted voltage to the LED string. The detecting module receives and calculates external PWM optical signals to obtain a duty-cycle ratio of the PWM optical signals, and compares the duty-cycle ratio of the external PWM optical signals with a predetermined threshold to determine if control signals have to be generated for the constant-current driving chip such that the constant-current driving chip controls the current passing through the LED string. The backlight driving circuit can operate normally even when the duty-cycle ratio of the PWM optical signals is very small. In addition, a liquid crystal display includes the above backlight driving circuit is also disclosed.

20 Claims, 3 Drawing Sheets

BACKLIGHT DRIVING CIRCUIT AND LIQUID CRYSTAL DISPLAY

BACKGROUND OF THE INVENTION

1. Field of the Invention

The present disclosure relates to liquid crystal display technology, and more particularly to a backlight driving circuit and a liquid crystal display (LCD).

2. Discussion of the Related Art

With the technology revolution, backlight technology of LCDs has been developed. Typical LCDs adopt cold cathode fluorescent lamps (CCFL) as the backlight sources. However, as the CCFL backlight is characterized by attributes including low color reduction ability, low lighting efficiency, high discharging voltage, bad discharging characteristics in low temperature, and also, the CCFL needs a long time to achieve a stable gray scale, LED backlight source is a newly developed technology.

Generally, backlight driving circuits are required to provide a driving voltage for LED strings. FIG. 1 is a schematic view of one conventional backlight driving circuit. As shown in FIG. 1, the backlight driving circuit includes a boost circuit 110, a LED string 120 and a constant-current driving chip 130.

The boost circuit 110 is controlled by the constant-current driving chip 130 to boost the input voltage Vin so as to drive the LED string 120. The input voltage Vin is concurrently input to the constant-current driving chip 130 such that the constant-current driving chip 130 can normally operate. The constant-current driving chip 130 receives external pulse width modulation (PWM) optical signals to control the current passing through the LED string 120 such that the LED string 120 can normally operate.

Specifically, the constant-current driving chip 130 includes a control module 131 and an operational amplifier 132. The control module 131 receives enable signals ENA such that the constant-current driving chip 130 begins its operation. The control module 131 outputs the driving signals to the MOS transistor Q1 of the boost circuit 110. When the MOS transistor Q1 is turn on, the inductor L stores energy. When the MOS transistor Q1 is turn off, the inductor L releases energy. In this way, the LED string 120 is provided with the voltage for emitting lights.

The positive input end of the operational amplifier 132 receives a constant voltage V1. The negative input end of the operational amplifier 132 feedbacks the voltage at the two ends of the resistor RT. The output end of the operational amplifier 132 couples with the gate of the MOS transistor Q2. The operational amplifier 132 compares the constant voltage V1 with the voltage at two ends of the resistor RT and then outputs control signals to adjust the voltage difference between the gate and the source of the MOS transistor Q2. As such, the current passing through the LED string 120 is controlled. The duty-cycle ratio of the current passing through the LED string 120 is determined by the duty-cycle ratio of the PWM optical signals. When the PWM optical signals are at high level, the operational amplifier 132 is capable of controlling the MOS transistor Q2. When the PWM optical signals are at low level, the operational amplifier 132 is unable to control the MOS transistor Q2. The MOS transistor Q2 is in an off state and there is no current passing through the LED string 120.

However, parasitic capacitance exists between the gate and the source of the MOS transistor Q2. When the external voltage is applied to the gate and the source of the MOS transistor Q2, the parasitic capacitance C is firstly charged. After the parasitic capacitance C is fully charged, the MOS transistor Q2 is turn on if the external voltage still exists. When the frequency of the PWM optical signals is fixed, the duration of the adjusting signals outputted from the operational amplifier 132 to the MOS transistor Q2 is short. In this way, the charging time of the parasitic capacitance C is short, which may results in that the MOS transistor Q2 cannot be fully turn on and the current passing through the LED string 120 cannot reach a predetermined level. It is to be noted that the predetermined level relates to the current capable of driving the LED string 120 to emit lights normally. Especially, if the duty-cycle ratio of the PWM optical signals is too small, the MOS transistor Q2 may not be in be turn on in time. As such, the constant-current driving chip 130 may erroneously determine that the LED string 120 is in the open-circuit state, which affects normal operations of the backlight driving circuit.

SUMMARY

The object of the invention is to provide a backlight driving circuit and the LCD with the same that can normally operate when the duty-cycle ratio of the PWM optical signals is small.

In one aspect, a backlight driving circuit, comprising: a boost circuit, a constant-current driving chip, a LED string coupled with the boost circuit, wherein the backlight driving circuit further comprises a detecting module; and wherein the boost circuit boosts an input voltage and then provides the boosted voltage to the LED string; the detecting module receives and calculates external PWM optical signals to obtain a duty-cycle ratio of the external PWM optical signals, and compares the duty-cycle ratio of the external PWM optical signals with a predetermined threshold to determine if control signals have to be generated for the constant-current driving chip such that the constant-current driving chip controls a current passing through the LED string.

In another aspect, a liquid crystal display, comprising: a liquid crystal panel and a LED backlight source arranged opposite to the liquid crystal panel, the LED backlight source provides a light source to the liquid crystal panel, the LED backlight source comprises a backlight driving circuit, and wherein the backlight driving circuit comprises a boost circuit, a constant-current driving chip, a LED string coupled with the boost circuit, wherein the backlight driving circuit further comprises a detecting module; and wherein the boost circuit boosts an input voltage and then provides the boosted voltage to the LED string; the detecting module receives and calculates external PWM optical signals to obtain a duty-cycle ratio of the external PWM optical signals, and compares the duty-cycle ratio of the external PWM optical signals with a predetermined threshold to determine if control signals have to be generated for the constant-current driving chip such that the constant-current driving chip controls a current passing through the LED string.

Wherein when the duty-cycle ratio of the external PWM optical signals is smaller than the predetermined threshold, the detecting module cuts off the external PWM optical signals and generates the PWM optical signals with the duty-cycle ratio equaling to the predetermined threshold, and detecting module provides the PWM optical signals to the constant-current driving chip.

Wherein when the duty-cycle ratio of the external PWM optical signals is smaller than the predetermined threshold, the detecting module cuts off the external PWM optical signals and outputs low level signals to an enable signals input end of the constant-current driving chip.

Wherein the LED string comprises a plurality of LEDs serially connected, a second MOS transistor, and a resistor; and wherein a drain of the second MOS transistor couples with the negative ends of the serially connected LEDs, a source of the second MOS transistor couples with one end of the resistor, and the other end of the resistor is electrically grounded, and a gate of the second MOS transistor couples with the constant-current driving chip.

Wherein the constant-current driving chip comprises a control module and an operational amplifier, the control module comprises an enable signal input end; and wherein the control module receives the input voltage and enable signals inputted from the enable signal input end, and the control module respectively couples with the boost circuit and the negative ends of the LEDs, an positive end of the operational amplifier receives a constant voltage, and a negative end of the operational amplifier couples between the source of the source of the second MOS transistor and one end of the resistor, and an output end of the operational amplifier couples with the gate of the second MOS transistor.

Wherein one end of the detecting module receives the external PWM optical signals, and the other end of the detecting module couples with the output end of the operational amplifier, or wherein one end of the detecting module receives the external PWM optical signals, and the detecting module respectively couples with an output end of the operational amplifier and the enable signal input end.

The backlight driving circuit and the LCD are capable of generating PWM optical signals with duty-cycle ratio equaling to the predetermined threshold or generating low level signals for the constant-current driving chip when the duty-cycle ratio of the external PWM optical signals is small. In this way, the LED string is controlled to emit lights normally or the constant-current driving chip is controlled to stop its operation. As such, the backlight driving circuit can operate normally.

DETAILED DESCRIPTION OF THE EMBODIMENTS

Figure 1:
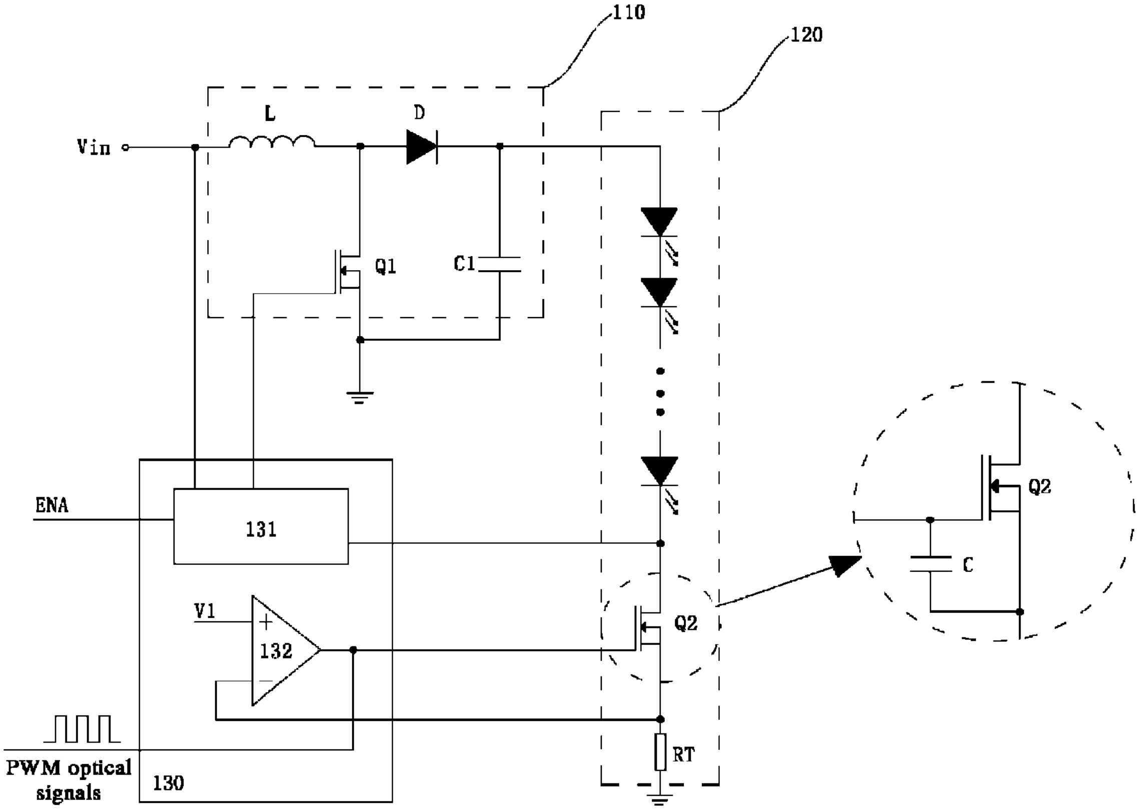
FIG. 1 is a schematic view of one conventional backlight driving circuit.

Various example embodiments will now be described more fully with reference to the accompanying drawings in which some example embodiments are shown. In the drawings, the thicknesses of layers and regions may be exaggerated for clarity. In the following description, in order to avoid the known structure and/or function unnecessary detailed description of the concept of the invention result in confusion, well-known structures may be omitted and/or functions described in unnecessary detail.

Figure 2:
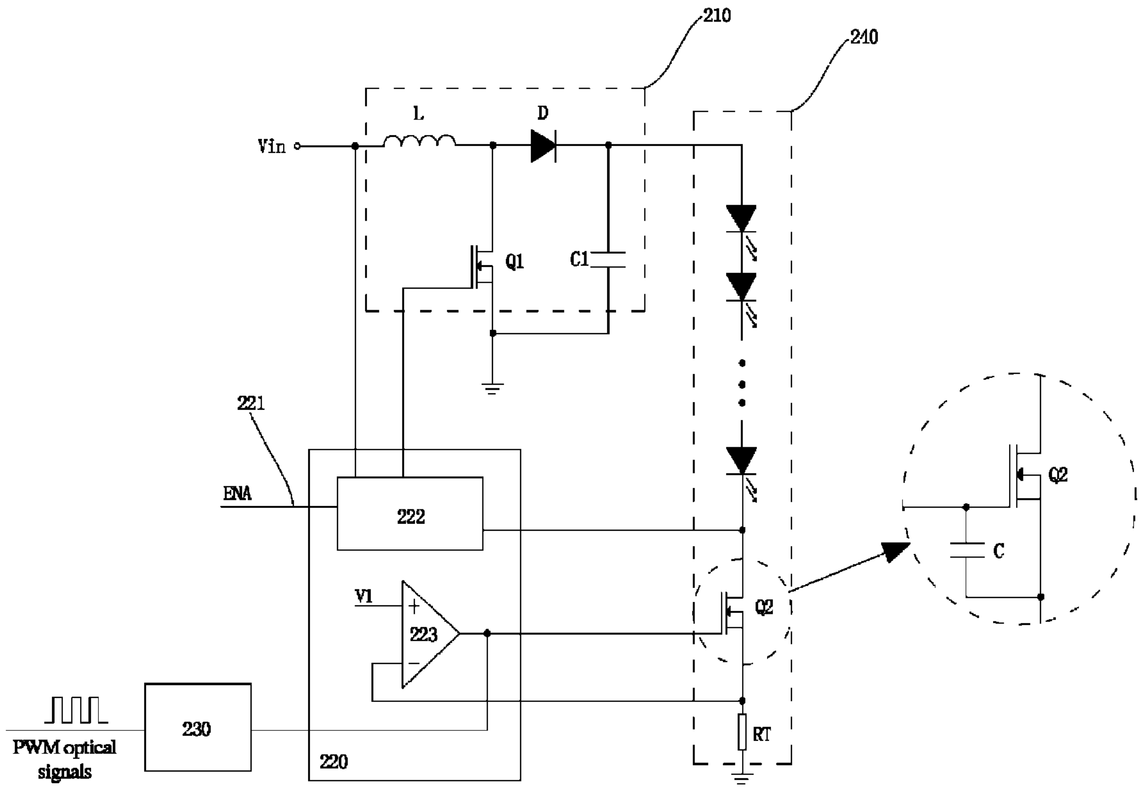
FIG. 2 is a schematic view of the backlight driving circuit in accordance with a first embodiment.

FIG. 2 is a schematic view of the backlight driving circuit in accordance with a first embodiment. The backlight driving circuit includes a boost circuit 210, a constant-current driving chip 220, a detecting module 230, and a LED string 240 coupled with the boost circuit 210.

The boost circuit 210 boosts the input voltage Vin when being controlled by the constant-current driving chip 220 so as to output the voltage capable of driving the LED string 240 to emit lights normally. In addition, the input voltage Vin is also provided to the constant-current driving chip 220 to act as the operation voltage. The detecting module 230 receives and calculates the external PWM optical signals to obtain a duty-cycle ratio of the PWM optical signals. The detecting module 230 then compares the duty-cycle ratio of the external PWM optical signals with a predetermined threshold to determine if the control signals have to be generated for the constant-current driving chip 220 such that the constant-current driving chip 220 is capable of controlling the current passing through the LED string 240.

Specifically, the boost circuit 210 includes an inductor L, a rectifier diode D, a capacitor C1, and a first MOS transistor Q1. One end of the inductor L receives the input voltage Vin, and the other end of the inductor L couples with the positive end of the rectifier diode D. The negative end of the rectifier diode D couples with the positive end of the LED string 240. One end of the capacitor C1 couples between the negative end of the rectifier diode D and the positive end of the LED string 240. The drain of the first MOS transistor Q1 couples between the other end of the inductor L and the rectifier diode D. The source of the first MOS transistor Q1 is electrically grounded. The gate of the first MOS transistor Q1 couples with the constant-current driving chip 220.

The LED string 240 includes a plurality of LEDs serially connected, a second MOS transistor Q2, and a resistor RT. The drain of the second MOS transistor Q2 couples with the negative ends of the serially connected LEDs. The source of the second MOS transistor Q2 couples with one end of the resistor RT, and the other end of the resistor RT is electrically grounded. The gate of the second MOS transistor Q2 couples with the constant-current driving chip 220.

The constant-current driving chip 220 includes a control module 222 and an operational amplifier 223. The control module 222 receives the input voltage Vin. In addition, the control module 222 configures the enable signals ENA, which are to be inputted to an enable signal input end 221, to drive the constant-current driving chip 220 to operate. The enable signals ENA is at high level. The control module 222 respectively couples with the gate of the first MOS transistor Q1 of the boost circuit 210 and the negative ends of the serially connected LEDs of the LED string 240 so as to provide the driving signals with a specific on/off frequency to the gate of the first MOS transistor Q1. In this way, the operations of the boost circuit 210 is controlled. The positive end of the operational amplifier 223 receives a constant voltage V1. The negative end of the operational amplifier 223 feedbacks the voltage at two ends of the resistor RT. The output end of the operational amplifier 223 couples with the gate of the second MOS transistor Q2. After comparing the constant voltage V1 with the voltage at two ends of the resistor RT, the operational amplifier 223 outputs the adjusting signals to control the voltage difference between the gate and the source of the second MOS transistor Q2 so as to determine the current passing through the LED string 240.

It is to be noted that the enable signals ENA inputted to the enable signal input end 221 may be at high level or at low level. When the enable signals ENA is at high level, the constant-current driving chip 220 is controlled to operate. When the enable signals ENA is at low level, the constant-current driving chip 220 stops its operation.

One end of the detecting module 230 receives the external PWM optical signals, and the other end of the detecting module 230 couples with the output end of the operational amplifier 223. In one embodiment, the detecting module 230 is a single chip microcomputer, such as a micro control unit (MCU). Specifically, the detecting module 230 calculates the duty-cycle ratio of the external PWM optical signals, and compares the duty-cycle ratio with the predetermined threshold. When the duty-cycle ratio of the external PWM optical signals is smaller than the predetermined threshold, the detecting module 230 cuts off the PWM optical signals. The detecting module 230 outputs the PWM optical signals to the gate of the second MOS transistor Q2 to ensure that the second MOS transistor Q2 is in the fully turn-on state. The duty-cycle ratio of the PWM optical signals equals to the predetermined threshold. As such, the current passing through the LED string 240 can reach the predetermined level, which means that the LED string 240 is capable of emitting lights normally. When the duty-cycle ratio of the external PWM optical signals is not smaller than the predetermined threshold, the external PWM optical signals have not to be processed by the detecting module 230. The unprocessed PWM optical signals are outputted to the gate of the second MOS transistor Q2 such that the second MOS transistor Q2 is in the turn-on state. The current passing through the LED string 240 can reach the predetermined level such that the LED string 240 emits lights normally.

Thus, by adding the detecting module 230, the duty-cycle ratio of the PWM optical signals, which is applied to the gate of the second MOS transistor Q2, is maintained to be above the predetermined threshold. If the duration of the adjusting signals, which are outputted from the operational amplifier 223 to the second MOS transistor Q2, is long enough, the charging time of the parasitic capacitance C between the gate and the source of the second MOS transistor Q2 is also long enough. As such, the parasitic capacitance C is fully charged and the second MOS transistor Q2 is in the fully turn-on state. The current passing through the LED string 240 can reach the predetermined level, and the LED string 240 can emit lights normally. Even during a booting procedure, if the duty-cycle ratio of the PWM optical signals is too small, the detecting module 230 still can turn on the second MOS transistor Q2, and the LED string 240 can emit lights normally. Thus, the constant-current driving chip 220 would not erroneously determine that the LED string 240 is in the open-circuit state, and thus the backlight driving circuit can operate normally.

It is to be noted that the predetermined threshold configured within the detecting module 230 ensures that the parasitic capacitance C between the gate and the source of the second MOS transistor Q2 can be fully charged. In addition, the second MOS transistor Q2 can be fully turn on, and the current passing through the LED string 240 can reach the predetermined level. In this way, the duty-cycle ratio of the PWM optical signals can satisfy the minimum requirement of the backlight driving circuit operation.

Figure 3:
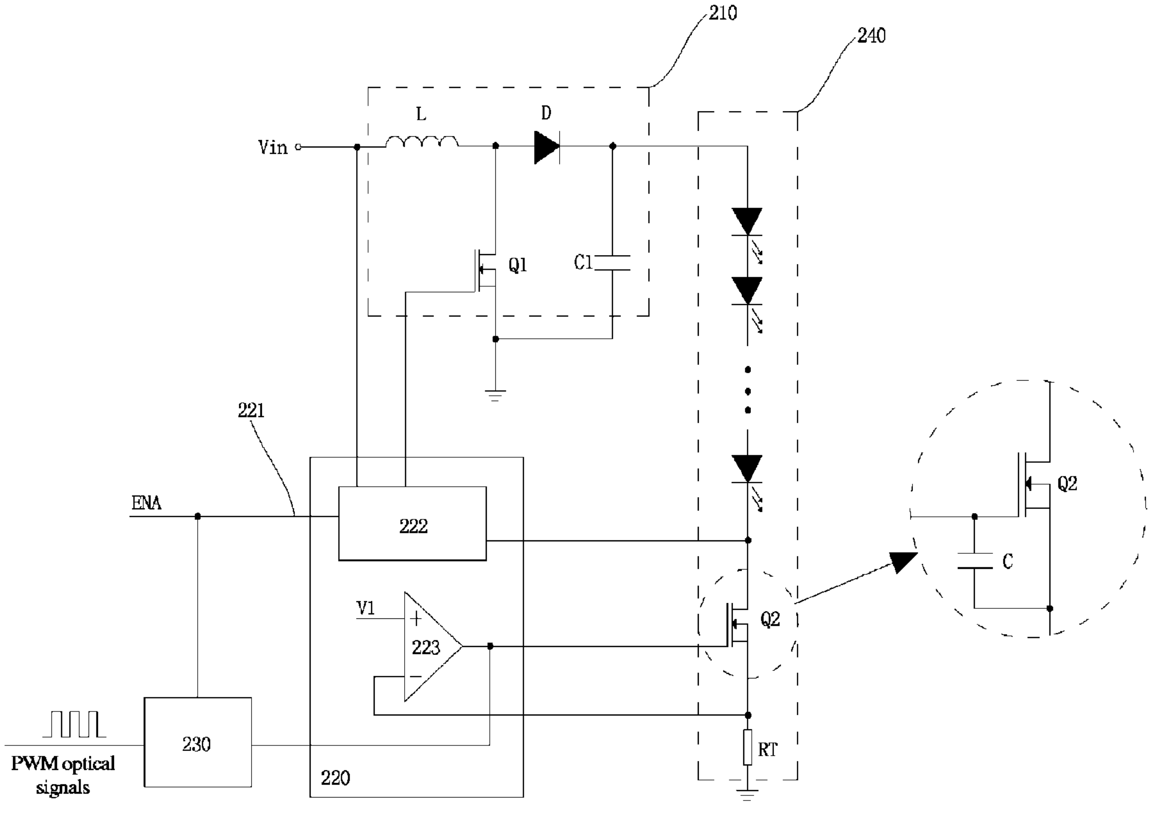
FIG. 3 is a schematic view of the backlight driving circuit in accordance with a second embodiment.

FIG. 3 is a schematic view of the backlight driving circuit in accordance with a second embodiment.

As shown in FIG. 3, the backlight driving circuit includes the boost circuit 210, the constant-current driving chip 220, the detecting module 230, and the LED string 240 coupling with the boost circuit 210.

The boost circuit 210 boosts the input voltage Vin when being controlled by the constant-current driving chip 220, and outputs the voltage capable of driving the LED string 240 to emit lights normally. In addition, the input voltage Vin is also provided to the constant-current driving chip 220 to act as the operation voltage of the constant-current driving chip 220. The detecting module 230 receives the external PWM optical signals and calculates the PWM optical signals to obtain the duty-cycle ratio. The detecting module 230 then compares the duty-cycle ratio of the PWM optical signals and the predetermined threshold to determine whether the control signals have to be generated for the constant-current driving chip 220 such that the constant-current driving chip 220 is capable of controlling the current passing through the LED string 240.

Specifically, the boost circuit 210 includes an inductor L, a rectifier diode D, a capacitor C1, and a first MOS transistor Q1. One end of the inductor L receives the input voltage Vin, and the other end of the inductor L couples with the positive end of the rectifier diode D. The negative end of the rectifier diode D couples with the positive end of the LED string 240. One end of the capacitor C1 couples between the negative end of the rectifier diode D and the positive end of the LED string 240. The drain of the first MOS transistor Q1 couples between the other end of the inductor L and the rectifier diode D. The source of the First MOS transistor Q1 is electrically grounded. The gate of the First MOS transistor Q1 couples with the constant-current driving chip 220.

The LED string 240 includes a plurality of LEDs serially connected, a second MOS transistor Q2, and a resistor RT. The drain of the second MOS transistor Q2 couples with the negative ends of the serially connected LEDs. The source of the second MOS transistor Q2 couples with one end of the resistor RT, and the other end of the resistor RT is electrically grounded. The gate of the second MOS transistor Q2 couples with the constant-current driving chip 220.

The constant-current driving chip 220 includes a control module 222 and an operational amplifier 223. The control module 222 receives the input voltage Vin. In addition, the control module 222 configures the enable signals ENA, which are to be inputted to an enable signal input end 221, to drive the constant-current driving chip 220 to operate. The enable signals ENA is at high level. The control module 222 respectively couples with the gate of the First MOS transistor Q1 of the boost circuit 210 and the negative ends of the serially connected LEDs of the LED string 240 so as to provide the driving signals with a specific on/off frequency to the gate of the first MOS transistor Q1. In this way, the operations of the boost circuit 210 is controlled. The positive end of the operational amplifier 223 is for receiving a constant voltage V1. The negative end of the operational amplifier 223 feedbacks the voltage at two ends of the resistor RT. The output end of the operational amplifier 223 couples with the gate of the second MOS transistor Q2. After comparing the constant voltage V1 with the voltage at the two ends of the resistor RT, the operational amplifier 223 outputs the adjusting signals to control the voltage difference between the gate and the source of the second MOS transistor Q2 so as to determine the current passing through the LED string 240.

It is to be noted that the enable signals ENA inputted to the enable signal input end 221 may be at high level or at low level. When the enable signals ENA is at high level, the constant-current driving chip 220 is controlled to operate. When the enable signals ENA is at low level, the constant-current driving chip 220 stops its operation.

One end of the detecting module 230 receives the PWM optical signals, and the other end of the detecting module 230 couples with the output end of the operational amplifier 223. In one embodiment, the detecting module 230 is a single chip microcomputer, such as a micro control unit (MCU). Specifically, the detecting module 230 calculates the duty-cycle ratio of the PWM optical signals, and compares the duty-cycle ratio with the predetermined threshold. When the duty-cycle ratio of the external PWM optical signals is smaller than the predetermined threshold, the detecting module 230 cuts off the external PWM optical signals. The detecting module 230 outputs the low level signals to the enable signal input end 221 of the constant-current driving chip 220 and the low level signals operate as the enable signals of the constant-current driving chip 220 to stop the operations of the constant-current driving chip 220. That is, the current passing through the LED string 240 is controlled to be zero by the constant-current driving chip 220. As such, the backlight driving circuit stops its operations, and the LED string 240 is prevented from twinkling due to a smaller duty-cycle ratio of the PWM optical signals. When the duty-cycle ratio of the PWM optical signals is not smaller than the predetermined threshold, the PWM optical signals have not to be processed by the detecting module 230. The unprocessed PWM optical signals are outputted to the gate of the second MOS transistor Q2 such that the second MOS transistor Q2 can be in the fully turn-on state. In this way, the current passing through the LED string 240 can reach the predetermined level and the LED string 240 emits lights normally.

Therefore, in the butting procedure, if the duty-cycle ratio of the PWM optical signals is too small, the detecting module 230 turns off the constant-current driving chip 220, and the constant-current driving chip 220 would not erroneously determine that the LED string 240 is in the open-circuit state.

It is to be noted that the predetermined threshold configured within the detecting module 230 ensures that the parasitic capacitance C between the gate and the source of the second MOS transistor Q2 can be fully charged. In addition, the second MOS transistor Q2 is fully turn on, and the current passing through the LED string 240 can reach the predetermined level. In this way, the duty-cycle ratio of the PWM optical signals can satisfy the minimum requirement of the backlight driving circuit operation.

Figure 4:
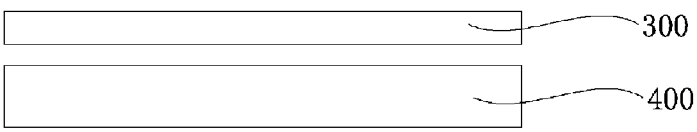
FIG. 4 shows the liquid crystal display in accordance with one embodiment.

In addition, any one of the backlight driving circuit disclosed in the above embodiments is incorporated in one LCD as shown in FIG. 4. In one embodiment, the LCD includes a liquid crystal panel 300 and a LED backlight source 400 arranged opposite to the liquid crystal panel 300. The LED backlight source 400 includes the above backlight driving circuit for providing the driving voltage, which controls the LED string to emit lights normally. In this way, the LED backlight source 400 provides light sources to the liquid crystal panel 300 such that the liquid crystal panel 300 can display images.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight driving circuit, comprising:

a boost circuit, a constant-current driving chip, a LED string coupled with the boost circuit, wherein the backlight driving circuit further comprises a detecting module; and wherein the boost circuit boosts an input voltage and then provides the boosted voltage to the LED string;

the detecting module receives and calculates external PWM optical signals to obtain a duty-cycle ratio of the external PWM optical signals, and compares the duty-cycle ratio of the external PWM optical signals with a predetermined threshold to determine if control signals have to be generated for the constant-current driving chip such that the constant-current driving chip controls a current passing through the LED string.

2. The backlight driving circuit as claimed in claim 1, wherein when the duty-cycle ratio of the external PWM optical signals is smaller than the predetermined threshold, the detecting module cuts off the external PWM optical signals and outputs low level signals to an enable signal input end of the constant-current driving chip.

3. The backlight driving circuit as claimed in claim 2, wherein the boost circuit comprises an inductor, a rectifier diode, a capacitor, and a first MOS transistor; and wherein one end of the inductor receives the input voltage, and the other end of the inductor couples with an positive end of the rectifier diode, a negative end of the rectifier diode couples with a positive end of the LED string, one end of the capacitor couples between the negative end of the rectifier diode and the positive end of the LED string, a drain of the first MOS transistor couples between the other end of the inductor and the rectifier diode, a source of the first MOS transistor is electrically grounded, and a gate of the first MOS transistor couples with the constant-current driving chip.

4. The backlight driving circuit as claimed in claim 2, wherein the LED string comprises a plurality of LEDs serially connected, a second MOS transistor, and a resistor; and wherein a drain of the second MOS transistor couples with the negative ends of the serially connected LEDs, a source of the second MOS transistor couples with one end of the resistor, and the other end of the resistor is electrically grounded, and a gate of the second MOS transistor couples with the constant-current driving chip.

5. The backlight driving circuit as claimed in claim 4, wherein the constant-current driving chip comprises a control module and an operational amplifier, the control module comprises an enable signal input end; and wherein the control module receives the input voltage and enable signals inputted from the enable signal input end, and the control module respectively couples with the boost circuit and the negative ends of the LEDs, an positive end of the operational amplifier receives a constant voltage, and a negative end of the operational amplifier couples between the source of the source of the second MOS transistor and one end of the resistor, and an output end of the operational amplifier couples with the gate of the second MOS transistor.

6. The backlight driving circuit as claimed in claim 5, wherein one end of the detecting module receives the external PWM optical signals, and the detecting module respectively couples with an output end of the operational amplifier and the enable signal input end.

7. The backlight driving circuit as claimed in claim 1, wherein when the duty-cycle ratio of the external PWM optical signals is smaller than the predetermined threshold, the detecting module cuts off the external PWM optical signals and generates the PWM optical signals with the duty-cycle ratio equaling to the predetermined threshold, and the detecting module provides the PWM optical signals to the constant-current driving chip.

8. The backlight driving circuit as claimed in claim 7, wherein the boost circuit comprises an inductor, a rectifier diode, a capacitor, and a first MOS transistor; and wherein one end of the inductor receives the input voltage, and the other end of the inductor couples with an positive end of the rectifier diode, a negative end of the rectifier diode couples with a positive end of the LED string, one end of the capacitor couples between the negative end of the rectifier diode and the positive end of the LED string, a drain of the first MOS transistor couples between the other end of the inductor and the rectifier diode, a source of the first MOS transistor is electrically grounded, and a gate of the first MOS transistor couples with the constant-current driving chip.

9. The backlight driving circuit as claimed in claim 7, wherein the LED string comprises a plurality of LEDs serially connected, a second MOS transistor, and a resistor; and wherein a drain of the second MOS transistor couples with the negative ends of the serially connected LEDs, a source of the second MOS transistor couples with one end of the resistor, and the other end of the resistor is electrically grounded, and a gate of the second MOS transistor couples with the constant-current driving chip.

10. The backlight driving circuit as claimed in claim 9, wherein the constant-current driving chip comprises a control module and an operational amplifier, the control module comprises an enable signal input end; and wherein the control module receives the input voltage and enable signals inputted from the enable signal input end, and the control module respectively couples with the boost circuit and the negative ends of the LEDs, an positive end of the operational amplifier receives a constant voltage, and a negative end of the operational amplifier couples between the source of the source of the second MOS transistor and one end of the resistor, and an output end of the operational amplifier couples with the gate of the second MOS transistor.

11. The backlight driving circuit as claimed in claim 10, wherein one end of the detecting module receives the external PWM optical signals, and the other end of the detecting module couples with the output end of the operational amplifier.

12. A liquid crystal display, comprising:

a liquid crystal panel and a LED backlight source arranged opposite to the liquid crystal panel, the LED backlight source provides a light source to the liquid crystal panel, the LED backlight source comprises a backlight driving circuit, and wherein the backlight driving circuit comprises a boost circuit, a constant-current driving chip, a LED string coupled with the boost circuit, wherein the backlight driving circuit further comprises a detecting module; and wherein the boost circuit boosts an input voltage and then provides the boosted voltage to the LED string;

the detecting module receives and calculates external PWM optical signals to obtain a duty-cycle ratio of the external PWM optical signals, and compares the duty-cycle ratio of the external PWM optical signals with a predetermined threshold to determine if control signals have to be generated for the constant-current driving chip such that the constant-current driving chip controls a current passing through the LED string.

13. The liquid crystal display as claimed in claim 12, wherein when the duty-cycle ratio of the external PWM optical signals is smaller than the predetermined threshold, the detecting module cuts off the external PWM optical signals and generates the PWM optical signals with the duty-cycle ratio equaling to the predetermined threshold, and detecting module provides the PWM optical signals to the constant-current driving chip.

14. The liquid crystal display as claimed in claim 13, wherein the LED string comprises a plurality of LEDs serially connected, a second MOS transistor, and a resistor; and wherein a drain of the second MOS transistor couples with the negative ends of the serially connected LEDs, a source of the second MOS transistor couples with one end of the resistor, and the other end of the resistor is electrically grounded, and a gate of the second MOS transistor couples with the constant-current driving chip.

15. The liquid crystal display as claimed in claim 14, wherein the constant-current driving chip comprises a control module and an operational amplifier, the control module comprises an enable signal input end; and wherein the control module receives the input voltage and enable signals inputted from the enable signal input end, and the control module respectively couples with the boost circuit and the negative ends of the LEDs, an positive end of the operational amplifier receives a constant voltage, and a negative end of the operational amplifier couples between the source of the source of the second MOS transistor and one end of the resistor, and an output end of the operational amplifier couples with the gate of the second MOS transistor.

16. The liquid crystal display as claimed in claim 15, wherein one end of the detecting module receives the external PWM optical signals, and the other end of the detecting module couples with the output end of the operational amplifier.

17. The liquid crystal display as claimed in claim 12, wherein when the duty-cycle ratio of the external PWM optical signals is smaller than the predetermined threshold, the detecting module cuts off the external PWM optical signals and outputs low level signals to an enable signals input end of the constant-current driving chip.

18. The liquid crystal display as claimed in claim 17, wherein the LED string comprises a plurality of LEDs serially connected, a second MOS transistor, and a resistor; and wherein a drain of the second MOS transistor couples with the negative ends of the serially connected LEDs, a source of the second MOS transistor couples with one end of the resistor, and the other end of the resistor is electrically grounded, and a gate of the second MOS transistor couples with the constant-current driving chip.

19. The liquid crystal display as claimed in claim 18, wherein the constant-current driving chip comprises a control module and an operational amplifier, the control module comprises an enable signal input end; and wherein the control module receives the input voltage and enable signals inputted from the enable signal input end, and the control module respectively couples with the boost circuit and the negative ends of the LEDs, an positive end of the operational amplifier receives a constant voltage, and a negative end of the operational amplifier couples between the source of the source of the second MOS transistor and one end of the resistor, and an output end of the operational amplifier couples with the gate of the second MOS transistor.

20. The liquid crystal display as claimed in claim 19, wherein one end of the detecting module receives the external PWM optical signals, and the detecting module respectively couples with an output end of the operational amplifier and the enable signal input end.

* * * * *